Aug. 3, 1926.
E. N. JACOBI
1,594,734
INSTRUMENT LIGHT
Filed Jan. 29, 1920
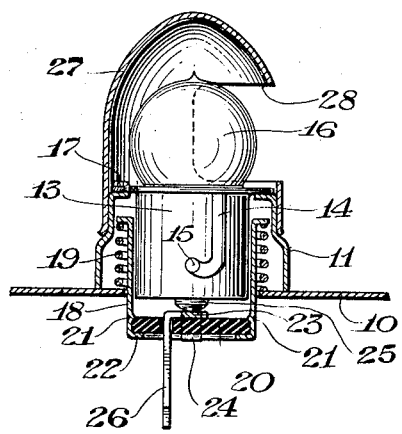
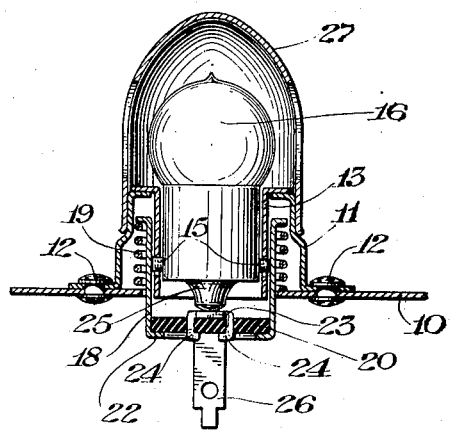
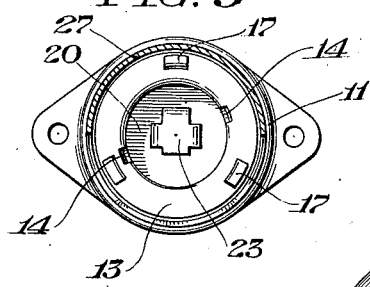
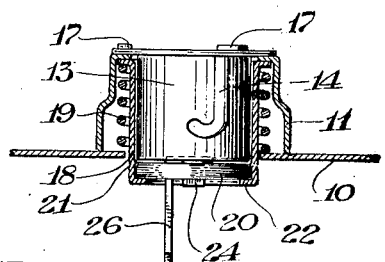
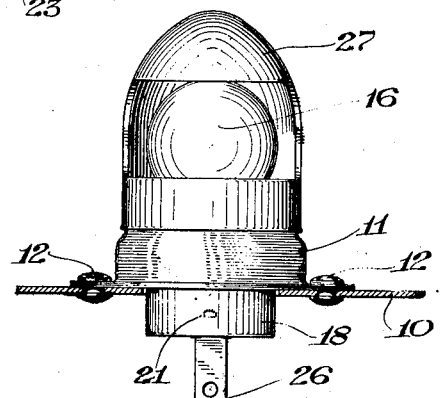
WITNESSES
INVENTOR
Edward N. Jacobi
By R. S. Caldwell
ATTORNEY Patented Aug. 3, 1926.

1,594,734

UNITED STATES PATENT OFFICE.

EDWARD N. JACOBI, OF MILWAUKEE, WISCONSIN, ASSIGNOR, BY MESNE ASSIGNMENTS, TO BRIGGS & STRATTON CORPORATION, OF MILWAUKEE, WISCONSIN, A CORPORATION OF DELAWARE.

INSTRUMENT LIGHT.

Application filed January 29, 1920. Serial No. 354,848.

This invention has for its object to provide an instrument light for use on the instrument panels of automobiles and for similar purposes.

An object of the invention is to simplify the construction and make it inexpensive to manufacture and at the same time condense it to make it suitable for use in places where space is limited.

Another object is to avoid the use of small spring means for holding the lamp in its socket and for maintaining electrical connection therewith and to substitute a large spring which will be more reliable and which will be housed within a base constituting a support for a hood or shield for directing the light where it is wanted and for protecting the lamp.

With the above and other objects in view the invention consists in the instrument light as herein claimed and all equivalents.

Referring to the accompanying drawings in which like characters of reference indicate the same parts in different views:

Fig. 1 is a central sectional view of an instrument light constructed in accordance with this invention; Fig. 2 is a similar view on a plane at right angles to the sectional plane of Fig. 1; and Fig. 3 is a transverse sectional view thereof with the lamp removed; Fig. 4 is a view similar to Fig. 1 with the lamp removed; and Fig. 5 is a front elevation of the instrument light with the panel sectioned.

In these drawings 10 indicates a sheet metal plate which may be the front plate of the panel board of an automobile instrument set or may be any other support for the light. A sheet metal shell 11 constituting a short cylinder with a contracted end portion forms a base resting on the plate 10 around an opening therein and is riveted in place by rivets 12 passing through ears or outstanding projections at its lower edge. The upper end of the base 11 is not only contracted but its edge is turned inwardly to form an inwardly extending flange. On this flange rests an outwardly extending flange of a slotted sleeve 13. This slotted sleeve 13 is of a cylindrical form with opposite bayonet slots 14 to receive the lugs 15 of the lamp 16 when the cylindrical base of the lamp is fitted within the sleeve as shown. The sleeve 13 is anchored in place and held against turning by lugs 17 extending upwardly from the edge of the flange of base 11 and through slots in the flange of sleeve 13 and then bent outwardly. In this manner the sleeve 13 is rigidly secured to the base 11.

Surrounding the sleeve 13 and projecting through the opening in the plate 10 is a cylindrical spring pressed contact holder 18 having an outwardly extending flange at its upper edge to form a spring seat for one end of a large coil spring 19 surrounding the contact holder 18 and seating at its other end on the plate 10 around its opening. A disk 20 of insulating material is held within the end of the contact holder 18 which is indented at 21 and provided with a flange 22 at its edge for this purpose. A contact 23 is mounted at the center of the insulating disk 20 by having the fingers 24 project from its opposite sides through the insulating disk and clinched thereto, as seen in Fig. 2. This contact is adapted to be engaged by the end terminal 25 of the lamp base to make electrical connection therewith and for convenience in making wiring connection the contact is provided with a tongue 26 also piercing the insulating disk and projecting therefrom to have the lead wire (not shown) soldered thereto.

When the lamp is inserted in its socket by entering the lugs 15 in the bayonet slots as usual, the end terminal 25 engages contact 23 and further movement of the lamp to bring the lugs to the off-set portions of the bayonet slots causes the spring pressed contact holder to move against the pressure of the spring and then when the lugs are in the pockets at the ends of the bayonet slots this pressure of the spring on the contact holder serves to hold the lamp firmly in place and to insure a good connection for both terminals of the lamp, the contacts 23 and 25 being held together with spring pressure and the contacts formed by the lugs 15 and their seats in the pockets of the sleeve 13 being also held together by the spring pressure. The return circuit is of the ground type, utilizing the sleeve 13 and the base 11 as a path of conductivity to the plate 10.

A metal hood 27 fits on the reduced portion of the base 11 to shield and protect the lamp and the light is directed as desired through the opening 28 in the side thereof. The instrument light of this invention utilizes a large coil spring housed within the base around the socket and consequently the spring may be made of such size and strength as to be durable and insure the firm seating of the lamp in its socket and the firm engagement of the contacts. The spring is not relied on to carry the current. The housing of the spring around the lamp socket condenses the construction and makes it suitable for use where space behind the front plate is limited, this spring housing at the same time affording a support for the hood and contributing to the neat and ornamental appearance.

What I claim as new and desire to secure by Letters Patent is:

1. An instrument light comprising a hollow base having an inner wall constituting a slotted lamp socket, a cup-shaped contact holder telescoping within the hollow base, and a spring within the hollow base acting on the contact holder to move it in an axial direction.

2. An instrument light comprising a hollow base having inner and outer walls and forming a spring chamber therebetween, the inner wall of the hollow base being adapted to receive a lamp base and to constitute a retaining socket therefor, a spring within the spring chamber, and a movable contact holder at the end of the lamp socket engaged by the spring.

3. An instrument light, comprising a plate having an opening, a cup-shaped contact holder passing through the opening, a coil spring surrounding the contact holder and bearing on the contact holder and on the plate, and a slotted sleeve mounted on the plate, and projecting within the contact holder.

4. An instrument light comprising a plate having an opening, an inwardly flanged base secured to the plate around the opening, an outwardly flanged sleeve within the base with its flange secured to the flange of the base, a cup-shaped contact holder around the sleeve and projecting through the opening of the plate, and a spring surrounding the contact holder within the base and bearing on the plate and on the contact holder.

5. An instrument light comprising a hollow base having an inner wall constituting a lamp socket, a coil spring housed within the base around the lamp socket, and a movable contact holder at the end of the lamp socket urged by the coil spring.

6. An instrument light comprising a plate provided with an opening, a shell forming a base secured to the plate and surrounding the opening and having a reduced end with an in-turned flange, a cylindrical sleeve with an out-turned flange, means for securing the flanges together with the sleeve within the base, said sleeve having bayonet slots, a cylindrical contact holder passing through the opening of the plate and surrounding the sleeve and provided with an out-turned flange at its upper end and an in-turned flange at its lower end, a spring surrounding the contact holder and bearing on its out-turned flange and on the plate, a disk of insulating material secured to the in-turned flange of the contact holder, and a contact comprising a piece of sheet metal having fingers projecting therefrom and piercing the insulating disk and clinched thereto and having a tongue also piercing the insulating material and projecting therefrom to form a wiring connection.

7. An instrument light comprising a base made up of two tubular walls, an inner wall and an outer wall, spaced apart and joined together, the inner wall serving as a lamp socket and the outer wall serving as a hood seat and the space between them serving as a housing for containing a coiled spring, a spring housed within said space, and a contact holder urged by the spring.

In testimony whereof, I affix my signature.

EDWARD N. JACOBI.